INVENTORS
Franz Dietl
Edgar Waka by Michael S. Striker
Attorney

United States Patent Office 3,463,997
Patented Aug. 26, 1969

3,463,997
EXCITATION SYSTEM FOR A POLYPHASE ALTERNATING CURRENT GENERATOR
Franz W. Dietl, Bietigheim, and Edgar Kuhn, Gerlingen, Germany, assignors to Robert Bosch GmbH, Stuttgart, Germany
Filed Dec. 14, 1966, Ser. No. 601,604
Claims priority, application Germany, Dec. 22, 1965, B 85,101
Int. Cl. H02p 9/02, 11/06
U.S. Cl. 322—24         13 Claims

ABSTRACT OF THE DISCLOSURE

A system for maintaining a constant voltage across the load of a generator by controlling the percent of time per cycle during which field current flows through a rectifier adapted to stop the field current when the sum of two voltages, one proportional to a positive change of output voltage of one phase and the other proportional to the output voltage of another phase, exceed a constant reference voltage.

Background of the invention

In conventional excitation systems the field current in a polyphase generator is controlled by three controlled rectifiers, (thyristors), one in each phase. The control of these thyristors is achieved by magnetic amplifiers which give an ignition pulse whose position in time depends on the output voltage of the generator. The magnetic amplifiers and associated transformers represent much equipment and also have the disadvantage that they can only be used for generators operating at constant speed. It is also possible to control these rectifiers by electrical means only. In this method, the departure from the desired value of output voltage is amplified by a transistor and controls the charging current of a capacitor. This capacitor then discharges over a unijunction transistor and thus gives a positive ignition pulse to the control rectifier. This apparatus also requires a great deal of equipment especially when used in each phase of the generator.

It is an object of this invention to devise an excitation system with a minimum of electrical parts.

It is a still further object of this invention to devise a controlled excitation system for a multiphase generator which can be used in either direction; that is, the generator can turn either clockwise or counterclockwise without necessitating a change in the circuitry.

Summary of the invention

This invention discloses an excitation system for a polyphase alternating current generator having a field winding, and output conductors to furnish a desired load voltage. According to this invention a controlled rectifier is connected to at least one phase of the load winding and the field current is supplied through this controlled rectifier. The control voltage for said cotrolled rectifier is derived by first detecting changes in the output voltage of said generator and generating a voltage proportional to said changes. A voltage proportional to the output voltage of the preceding phase of the generator is also developed. The two voltages are superimposed. Means are provided to compare the superimposed voltages to a constant reference voltage. When the superimposed voltages exceed said constant reference voltage a control voltage is generated to stop the conduction of the controlled rectifiers and thus inhibit the flow of field current. If three phase field excitation is desired, a controlled rectifier is used in conjunction with each load winding and the control voltage for said controlled rectifier is derived using only a single reference voltage and only single means for detecting changes in the output voltage of the generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figure 1:
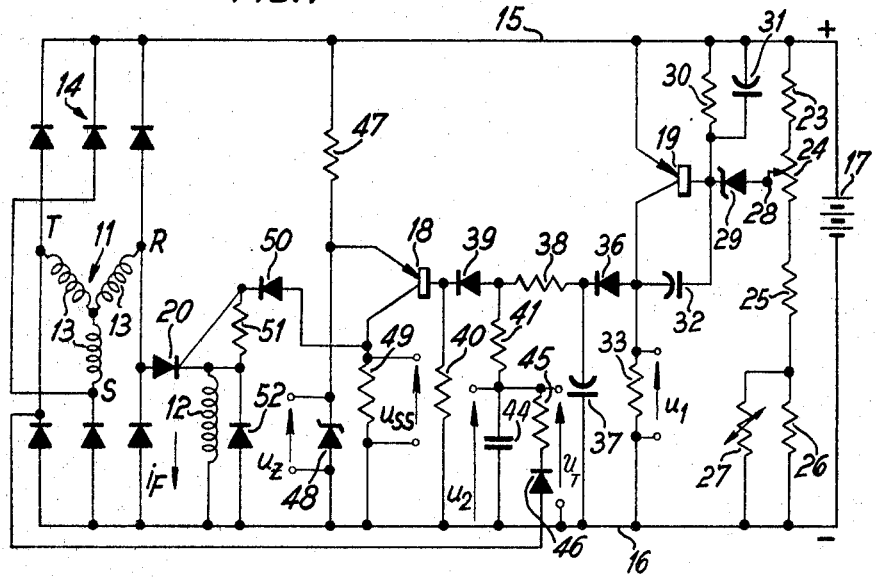
FIG. 1 is a schematic diagram of a preferred form of the present invention.

In FIG. 1 the alternating current generator is designated 11, the field winding 12, and the three-phase load winding are designated 13. Either winding 12 or 13 may be motor-driven.

The three-phase winding 13 is connected to a three-phase bridge rectifier designated 14. The battery 17 which is to be charged by generator 11 is connected to the rectifiers by output conductors 15 and 16. Further loads may be connected in parallel with battery 17. The conductor 15 is also designated as the positive output conductor and the conductor 16 is also designated as the negative output conductor in the following description.

In order to keep the voltage between conductors 15 and 16 substantially constant, the generator is equipped with a regulating system. This consists mainly of transistors 18 and 19 and a controlled semi-conductor rectifier 20. The transistor 19 serves to generate a voltage which is substantially proportional to a positive change of the load voltage: that is, the difference between the instantaneous and the desired voltage between conductors 15 and 16. The transistor 18 controls the conduction of semi-conductor rectifier 20 which in turn permits the passage of field current $I_f$ through field winding 12 when it is in the conducting state. The timing of the initiation of conduction depends on the magnitude of the difference between the actual output voltage and the desired output voltage.

A voltage divider consisting of impedances 23, 24, 25, 26 is connected from conductor 15 to conductor 16. The impedance 24 is a potentiometer. A thermistor 27 is put in parallel to impedance 26 to provide temperature compensation. Connected to potentiometer arm 28 of impedance 24 is the anode of Zener diode 29, whose cathode is connected to the base of transistor 19, and, by the parallel combination of impedance 30 and condenser 31, to the conductor 15. The anode of Zener diode 29 is also connected to collector of transistor 19 by capacitor 32. The collector of transistor 19 in turn is connected to conductor 16 by means of collector impedance 33. The emitter of transistor 19 is connected to positive output conductor 15. The anode of the diode 36 is connected to the collector of transistor 19. The cathode of diode 36 is connected to output conductor 16 by capacitor 37 and to the base of transistor 18 by impedance 38, and an additional diode polarized in the same direction, diode 39. Base impedance 40 is connected between the base of transistor 18 and conductor 16. An impedance 41 is connected to the anode of diode 39, and the other terminal of impedance 41 is connected to output conductor 16 by capacitor 44. It is also connected to the preceding phase T of the alternating current generator by diode 46 and impedance 45. The emitter of transistor 18 is connected to output conductor 15 by a impedance 47 and is also directly connected to the cathode of Zener diode 48, whose anode is connected to conductor 16. The collector of transistor 18 is connected to output conductor 16 by collector impedance 49, and is also connected to the anode of diode 50. The cathode of diode 50 is connected to the control electrode of the controlled semi-conductor rectifier 20. Impedance 51 is connected from the cathode of diode 50 and to the cathode of semi-conductor rectifier 20, which is also connected to field winding 12. The anode of semi-conductor rectifier 20 is connected to one phase, the R phase, of generator 11 and the other terminal of field winding 12 is connected to conductor 16. A damping diode 52 is connected in parallel to field winding 12.

Figure 3:
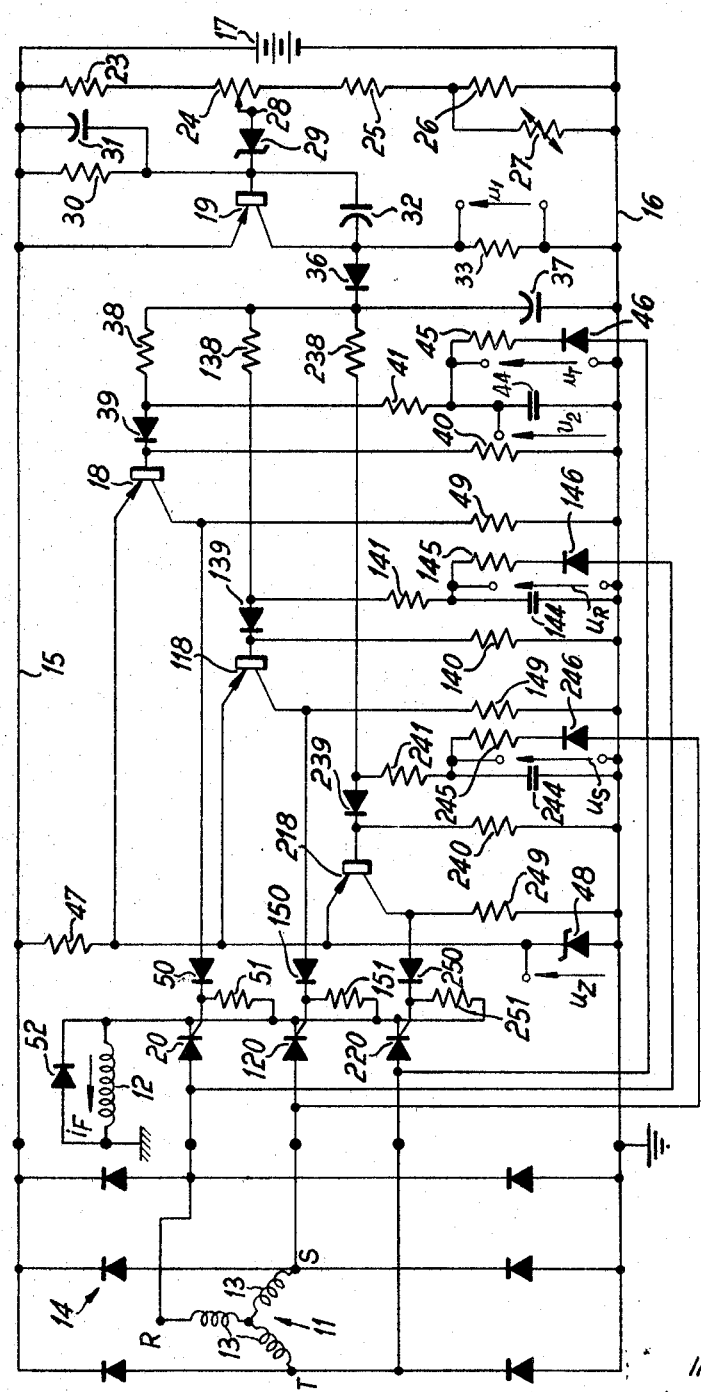
FIG. 3 is a schematic diagram of the preferred embodiment of this invention as used in three-phase field current excitation.

FIG. 3 shows substantially the same circuitry as FIG. 1, but adapted to three-phase field excitation. Thus each of the phases R, S, and T have a controlled semi-conductor rectifier: that is, semi-conductor rectifier 20 for phase R, phase S has semi-conductor rectifier 120, and phase T has semi-conductor rectifier 220. The individual regulator systems correspond to that pictured in FIG. 1, and the same explanations apply. The designating figures are the same except those for phase R are those corresponding to FIG. 1, those for phase S are increased by 100, and those for phase T are increased by 200. The input circuitry for transistor 19 is used jointly by all three phases, as is the reference voltage $U_Z$ generated by Zener diode 48.

Figure 2:
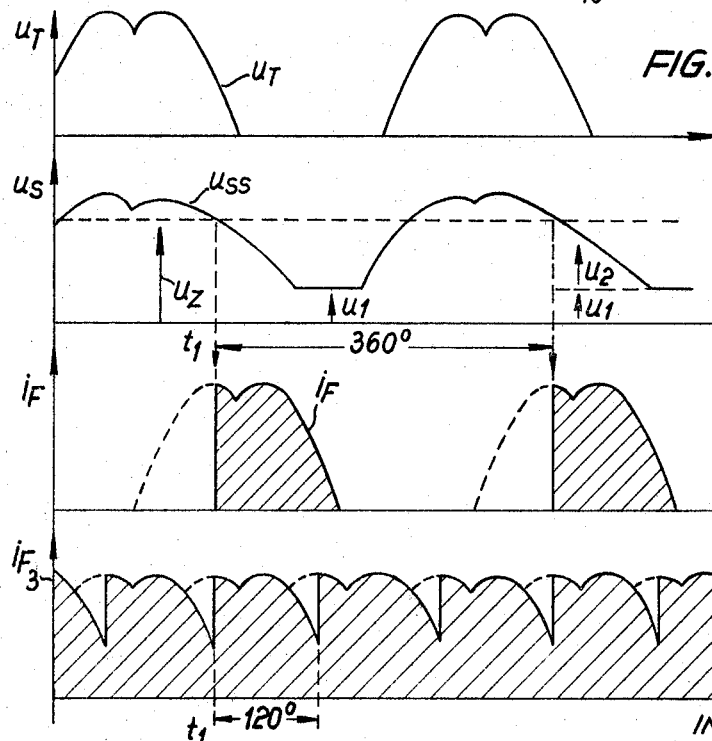
FIG. 2 shows the voltage and current variations with time at specific points of the circuit of FIG. 1.

The above circuitry operates as follows:

Referring first to FIG. 1, let it be assumed that the voltage between conductors 15 and 16 is the desired value. The potentiometer arm 28 of the potentiometer 24 is so positioned that Zener diode 29 does not reach its breakdown voltage under these conditions. Therefore there is no base current flowing in transistor 19, and therefore the collector current is also zero, so that voltage $U_1$ across collector impedance 33 is also zero. The voltage at the base of transistor 18 then consists solely of the voltage $U_2$ across capacitor 44, which is charged by diode 46 and which discharges during each period over impedances 40 and 41 and the diode 39. As shown in FIG. 2, line 2, this discharge results in a slower voltage drop of voltage $U_{SS}$ as compared to the drop of voltage $U_T$ shown in line 1 of FIG. 2. Since the voltage $U_{SS}$ is in this case always smaller than the reference voltage $U_Z$ of Zener diode 48, transistor 18 is in the conducting phase, since its base is always negative relative to its emitter. The collector is therefore substantially at the potential of the positive output conductor 15, so that the control electrode of semi-conductor rectifier 20 receives a positive voltage over diode 50. Semi-conductor rectifier 20 therefore conducts as long as there is a positive voltage between its anode and its cathode. Field winding 12 therefore receives its full excitation current.

It the voltage between conductor 15 and 16 exceeds its desired value, the voltage across Zener diode 29 exceeds the breakdown voltage. Thus base current flows in transistor 19. The breakdown voltage may obviously be adjusted to a desired value at potentiometer arm 28. When the breakdown voltage of Zener diode 29 is exceeded, the base current of transistor 19 is proportional to the difference between the instantaneous load voltage and the desired load voltage. Therefore, the collector current of transistor 19 is also proportional to this difference, and therefore the voltage drop $U_1$ across collector impedance 33 is also proportional to it. Because of the amplification of transistor 19 this voltage $U_1$ may be larger than the rise in load voltage. For example a rise in load voltage of a tenth of a volt may correspond to a voltage $U_1$ of 9/10 of a volt.

The voltage $U_1$ is superimposed upon voltage $U_2$ at capacitor 44; the resulting voltage $U_{SS}$ at the base of transistors 18 is shown in FIG. 2 in the second row. The voltage $U_{SS}$ follows the equation $$U_{SS} = C(U_1 + U_2)_1$$

wherein the constant C is smaller than unity. In FIG. 2, the drawing shows C as being equal to 1.0. It will be understood by those skilled in the art that the form of the voltage $U_{SS}$ is independent of this constant C. As can be seen in FIG. 2, whenever this voltage $U_{SS}$ exceeds the voltage $U_Z$ at Zener diode 48 the transistor 18 does not conduct, so that its collector potential is substantially that of negative conductor 16. Therefore a negative voltage is conducted to the control electrodes of semi-conductor rectifier 20, so that it does not conduct. Only when the instantaneous value of the voltage $U_{SS}$ is smaller than the voltage $U_Z$ of Zener diode 48 does the transistor 18 conduct again and thus initiate the conduction of semi-conductor rectifier 20. As shown in FIG. 2, for the assumed size of $U_1$ the semi-conductor rectifier will start to conduct at $t_1$, $t_1+360°$, etc. Therefore field winding 12, as shown in FIG. 2, third row, receives excitation current only part of the time. The average value of excitation current thus is decreased. Therefore the load voltage of generator 11 is decreased until the load voltage again reaches its desired value and the Zener diode 29 is no longer in the breakdown condition. Since the voltage $U_2$ is the voltage of a preceding phase (phase T) it is possible to move the time of initiation of conduction of conduction of semi-conductor rectifier 20 over the whole region in which the anode of the rectifier 20 is more positive than its cathode. The timing of the initiation of conduction is further facilitated by the condenser 44 with its diode 46 and the discharge circuit comprising impedance 40 and 41 and the diode 39. This arrangement allows the time of initiation of conduction to vary over a very wide range and allows satisfactory regulation even when the direction of rotation of the generator is reversed.

Returning now to FIG. 3, the three semi-conductor rectifiers 20, 120, and 220 control the flow of excitation current through the field winding 12 as shown in the last row of FIG. 2. With increasing positive load voltage the point of ignition $t_1$, $t_1+120°$, $t_1+240°$, etc., moves always further to the right so that the excitation current decreases continually. However, it is always a modulated DC current. The semi-conductor rectifiers 20, 120 and 220 therefore can have less current capacity in this arrangement. A further advantage of this arrangement is that it will work satisfactorily even with phase reversal, because the storage effect of capacitor 44, 144, and 244 enables even the phase 240° removed to control the semi-conductor rectifier.

While the invention has been illustrated and described as embodied in a regulating system for a three phase alternating current generator, it is not intended to be limited, to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the stand point of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an excitation system for a polyphase alternating current generator having a field winding, and output conductors to furnish a desired load voltage, in combination, first circuit means responsive to the difference between the instantaneous load voltage and said desired load voltage and adapted to yield a first voltage as a function of said difference; rectifier means connected to at least one phase of said polyphase alternating current generator and adapted to furnish the excitation current for said field winding; second circuit means for furnishing a second voltage proportional to the output voltage of another phase of said multiphase alternating current generator; superimposing circuit means for superimposing said first and second voltage; maens for furnishing a constant reference voltage; comparison means for comparing said superimposed first and second voltage to said reference voltage and generating a control voltage; and connecting means adapted to apply said control voltage to said rectifier means to control the flow of said excitation field current.

2. An excitation system as set forth in claim 1, wherein said control voltage is adapted to stop the flow of said excitation field current through said rectifier means when said superimposed first and second voltage exceed said reference voltage.

3. An excitation system as set forth in claim 1, wherein said rectifier means comprise semi-conductor rectifiers having a control electrode.

4. An excitation system as set forth in claim 1, wherein said rectifier means comprise thyristors.

5. An excitation system as set forth in claim 1 wherein said first circuit means comprise switching means responsive to the difference between said instantaneous load voltage and said desired load voltage, and first amplifier means controlled by said switching means.

6. An excitation system for an alternating current generator as set forth in claim 1, wherein said second circuit means comprise rectifier means connected to said other phase.

7. An excitation system for an alternating current generator as set forth in claim 1 wherein said superimposing means comprise a capacitor and a capacitor discharge circuit.

8. An excitation system for an alternating current generator as set forth in claim 1, wherein said means for obtaining a reference voltage comprise a Zener diode.

9. An excitation system for an alternating current generator as set forth in claim 1, wherein said comparison means comprise the emitter-base circuit of second amplifier means; and wherein said control voltage generating means comprise the emitter-collector circuit of said second amplifier means.

10. An excitation system for an alternating current generator as set forth in claim 1 wherein said connecting means comprise a diode.

11. An excitation system for an alternating current generator as set forth in claim 1, wherein said rectifier means and said second amplifier means are connected to each phase of said alternating current generator for three phase field excitation and comprising only single means for obtaining a reference voltage and single first circuit means in said three phase operation.

12. An excitation system as set forth in claim 11, also comprising decoupling means between said second amplifier means associated with different phases.

13. An excitation system as set forth in claim 12, wherein said decoupling means comprise diodes.

References Cited

UNITED STATES PATENTS

| | | | |
|---|---|---|---|
| 2,972,712 | 2/1961 | Landstorfer | 322—25 |
| 3,121,836 | 2/1964 | Rosenberry | 322—24 |
| 3,173,074 | 3/1965 | Domann | 322—28 |

OTHER REFERENCES

German printed application, No. 1,155,522, October 1963, Dietl.

ORIS L. RADER, Primary Examiner

H. HUBERFELD, Assistant Examiner

U.S. Cl. X.R.

322—28, 36, 73